United States Patent [19]
Gehlert et al.

[11] 3,973,841
[45] Aug. 10, 1976

[54] MOTION PICTURE CAMERA WITH DISSOLVE MECHANISM

[75] Inventors: Rolf Gehlert, Munich; Friedrich Winkler, Unterhaching, both of Germany

[73] Assignee: AGFA-Gevaert, A.G., Leverkusen, Germany

[22] Filed: July 14, 1975

[21] Appl. No.: 595,680

[30] Foreign Application Priority Data
July 17, 1974 Germany............................ 2434352

[52] U.S. Cl................................ 352/91 C; 352/171
[51] Int. Cl.[2]......................................... G03B 21/36
[58] Field of Search............... 352/91 R, 91 C, 91 S, 352/171

[56] References Cited
UNITED STATES PATENTS

| | | | |
|---|---|---|---|
| 3,712,720 | 1/1973 | Winkler.............................. | 352/91 S |
| 3,748,029 | 7/1973 | Sakaguchi........................... | 352/91 S |
| 3,851,956 | 12/1974 | Komine............................... | 352/91 C |

*Primary Examiner*—Monroe H. Hayes
*Attorney, Agent, or Firm*—Michael J. Striker

[57] ABSTRACT

A motion picture camera wherein the trigger of the camera release is movable from an extended position to a second position in which it starts the camera motor, and beyond the second position to thereby cause an auxiliary tooth to enter a gap in the annulus of teeth at the periphery of a program wheel which forms part of the mechanism for making exposures with dissolve. The auxiliary tooth is thereby moved into the path of cyclical movement of the pallet on a pawl which is driven whenever the motor is on whereby the pallet can move the program wheel from a starting position and thereupon cooperates with the teeth of the program wheel to rotate the latter through one revolution during which the program wheel initiates the making of exposures with fade-out and subsequent rearward transport of film frames which were exposed with fade-out, and prepares the motor for renewed forward transport of such film frames with simultaneous exposure with fade-in. The renewed forward transport is effected by depressing the trigger. The motor remains in operation while the user moves the trigger beyond the second position so that the making of exposures with fade-out can follow, without any interruption, the making of normal exposures.

22 Claims, 1 Drawing Figure

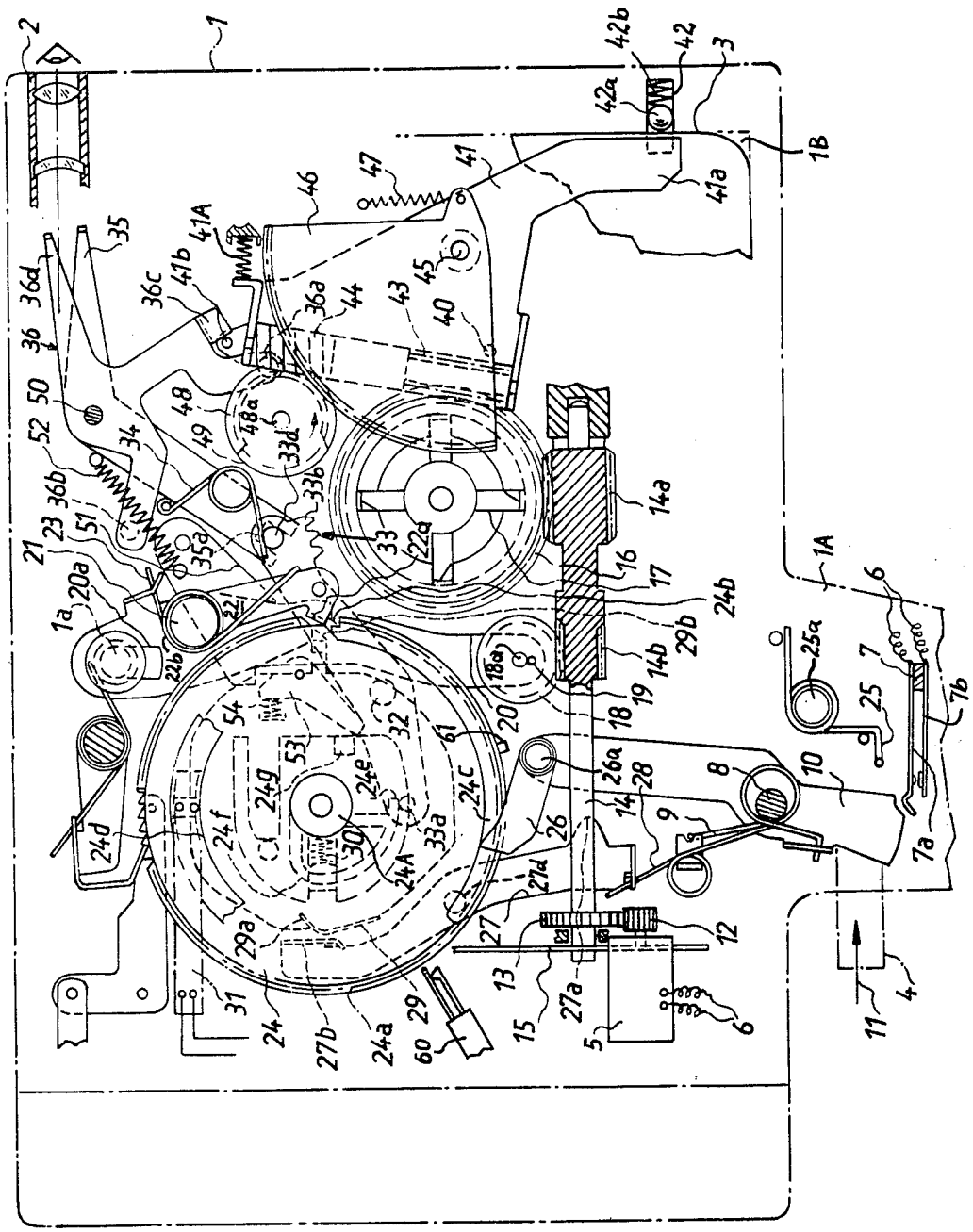

MOTION PICTURE CAMERA WITH DISSOLVE MECHANISM

BACKGROUND OF THE INVENTION

The present invention relates to motion picture cameras in general, especially to motion picture cameras for use with 8mm film, and more particularly to improvements in cameras which are provided with means for making exposures with dissolve.

It is known to install in a motion picture camera a dissolve mechanism which enables the operator to expose a series of film frames with fade-out effect and to thereupon expose such series with fade-in effect in order to create the impression that a new scene merges into the preceding scene. It is also known to utilize in dissolve mechanisms a program wheel which has a circumferentially complete annulus of teeth adapted to be engaged and displaced by a pawl when the operator of the motion picture camera decides to make exposures with dissolve. The program wheel controls a sequence of operations including the exposure of a predetermined number of film frames with fade-out, rearward transport of such film frames, and stoppage of the camera motor when the frames are moved back to a position upstream or ahead of the film gate. The making of exposures with fade-in is normally started in response to renewed actuation of the camera release.

In presently known motion picture cameras which employ the just described dissolve mechanism, the making of exposures with fade-out (i.e., the first phase of operation with dissolve) must be preceded by stoppage of the camera motor. This means that the end of a scene cannot be photographed immediately following the preceding major part of such scene. Alternatively, it is necessary to install in the camera an extremely complex, bulky, sensitive and expensive auxiliary equipment which must be properly set prior to starting of the camera motor. The making of exposures with dissolve can begin by removing the finger from the trigger of the camera release (i.e., by relaxing the finger pressure sufficiently to enable the trigger to assume its idle or extended position) and by thereupon immediately depressing the trigger. Such cameras also exhibit the drawback that the making of exposures must be interrupted, if only for one or more seconds, prior to the first fade-out shot.

SUMMARY OF THE INVENTION

An object of the invention is to provide a motion picture camera, particularly for use with 8mm film, which can start the making of exposures with dissolve without preceding stoppage of the camera motor.

Another object of the invention is to provide a novel and improved mechanism for making exposures with dissolve in a motion picture camera and to construct and assemble the mechanism in such a way that the last normal exposure of a series is followed, without any interruption whatever, by the first exposure with fade-out effect.

A further object of the invention is to provide a novel and improved dissolve mechanism of the type wherein various phases of operation with dissolve are programmed by a rotary member.

An additional object of the invention is to provide a dissolve mechanism which embodies novel and improved means for indicating all important phases of operation when the mechanism is in actual use.

Still another object of the invention is to provide a novel operative connection between the release of a motion picture camera and the improved dissolve mechanism.

A further object of the invention is to provide a novel and improved rotary program wheel for use in a dissolve mechanism of the above outlined character.

An ancillary object of the invention is to provide a novel release for a motion picture camera which embodies the improved dissolve mechanism.

Another object of the invention is to provide a relatively simple, compact, inexpensive and rugged dissolve mechanism whose versatility exceeds that of heretofore known mechanisms for the making of superimposed exposures with fade-out and fade-in effect.

The motion picture camera which embodies the invention comprises a housing or body, film transporting means installed in the housing (such film transporting means comprises a conventional pull-down and means for rotating the takeup reel for motion picture film, preferably 8mm film which is stored in a magazine), a prime mover mounted in the housing and being operable to actuate the film transporting means and a suitable shutter (e.g., a rotary shutter), and a mechanism for making exposures with dissolve. The mechanism is mounted in the housing and comprises a program member (e.g., a wheel) having an annulus of teeth and being rotatable from a predetermined starting position through one revolution to thereby effect the exposure of a predetermined number of film frames with fade-out, rearward transport of such film frames and exposure of the frames with fade-in, a gap in the annulus of teeth, an advancing device (preferably a pawl) which receives motion from the prime mover to perform a movement along a predetermined path including the aforementioned gap in the annulus of teeth when the program member is held in the starting position so that the advancing device is incapable of moving the program member from the starting position, and at least one auxiliary tooth which is rotatable with the program member and is movable into and from the gap so as to complete the annulus of teeth when it extends into the gap. The camera further comprises actuating means (such actuating means may include a camera release and a lever or slide which receives motion from the release) for temporarily moving the auxiliary tooth into the gap at the will of the operator (also while the prime mover is in operation so that the camera makes normal exposures) so as to enable the advancing device to move the program member from the starting position through the medium of the auxiliary tooth and to thereupon cooperate with the annulus of teeth in order to rotate the program member. The motion transmitting means for the advancing device is preferably designed to permanently connect the advancing device with the prime mover so that the advancing device moves along the predetermined path whenever the prime mover is in operation. The means for engaging the auxiliary tooth or the annulus of teeth on the program member preferably constitutes the pallet of the aforementioned pawl, and such pallet is preferably caused to perform a cyclical movement along an endless path whenever the prime mover is on. Since the auxiliary tooth can be moved into the gap whenever the operator desires, for example, by moving a trigger of the camera release beyond that position in which the prime mover is maintained in operation (but without interrupting the operation of the prime mover, e.g., a reversible electric motor), the making of exposures with fade-out can follow, without any interruptions, the making of normal exposures.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic longitudinal vertical sectional view of a motion picture camera which embodies the improved dissolve mechanism, the program member of the dissolve mechanism being shown in its starting position.

DESCRIPTION OF THE PREFERRED EMBODIMENTS

The motion picture camera which is shown in the drawing comprises a housing or body 1 with a view finder 2 and a pistol grip handle 1A supporting a depressible trigger 4 which forms part of the camera release. The housing or body 1 defines a chamber 1B for a removable magazine or container 3 containing 8mm motion picture film. The lens (not shown) is mounted on or in the left-hand or front wall of the body 1 in front of a rotary shutter 15.

The body 1 further contains a prime mover 5, e.g., a reversible electric motor, which is connected in circuit with an energy source (not shown) and a normally open starting switch 7 by way of conductors 6. The elastic upper contact or prong 7a of the starting switch 7 is located in the path of movement of the lower arm of a lever 10 which forms part of the camera release and is turnable in the body about a pivot 8. The lever 10 is biased against the inner end of the trigger 4 by a torsion spring 9. When the trigger 4 is depressed in the direction indicated by arrow 11, the lever 10 is pivoted anticlockwise, as viewed in the drawing, and its lower arm closes the switch 7 by flexing the contact 7a into engagement with the other contact 7b. The operator of the camera encounters a much more pronounced resistance to further depression of the trigger 4 when the lower arm of the lever 10 comes into abutment with a yieldable resilient stop here shown as a torsion spring 25 coiled around a post 25a in the handle 1A. Thus, while the trigger 4 moves from the illustrated first or extended position to a second or intermediate position (in which the lever 10 engages the stop 25), the operator must overcome only the resistance of the spring 9. Further movement of the trigger 4 in the direction indicated by arrow 11 must take place against the combined opposition of spring 9 and resilient stop 25. The switch 7 remains closed while the trigger 4 moves beyond the intermediate or second position toward a fully depressed or third position, i.e., the motor 5 is on as long as the contact 7a engages the contact 7b.

The motor 5 drives a shaft 14 in the body 1 through the medium of a transmission including spur gears 12 and 13. The shaft 14 is rigid with the rotary shutter 15 and further carries two worms 14a, 14b. The worm 14a transmits motion to the film transporting mechanism which includes a helical gear 16 in mesh with the worm 14a and a cruciform driving element 17 which receives torque from the helical gear 16 and can engage a complementary element on the takeup reel for motion picture film in a properly inserted magazine 3. The torque-transmitting connection between the gear 16 and driving element 17 may comprise a friction clutch or a releasable coupling, not shown.

The worm 14b meshes with a helical gear 18 which is mounted in the body 1 on a shaft 18a and has an eccentric pin 19 for the lower end of a lever 20 forming part of a motion transmitting means in the improved dissolve mechanism. The upper end portion of the lever 20 has an elongated slot 20a for a guide pin 1a which is mounted in the body 1. The guide pin 1a cooperates with the eccentric pin 19 to insure that the lever 20 performs recurrent oscillatory movements about the axis of the guide pin 1a and simultaneously moves up or down in response to rotation of the worm 14b on the shaft 14. The lever 20 carries a pivot 21 for an advancing device here shown as a pawl 22 which is biased clockwise, as viewed in the drawing, by a torsion spring 23 so that its pallet 22a normally bears or tends to bear against the adjacent tooth of an annulus of teeth 24a provided at the periphery of a rotary program member or wheel 24. The spring 23 can be replaced with a spring (e.g., a helical spring) which pulls (rather than pushes) the pallet 22a of the advancing device or pawl 22 against the periphery of the program wheel 24. The latter is rotatable in the body 1 about the axis of a shaft 24A. When the program wheel 24 assumes the illustrated starting position, the pallet 22a of the pawl 22 extends into a gap 24b provided in the annulus of teeth 24a at the periphery of the wheel 24 and preferably having a width corresponding to the maximum width of one of the teeth 24a. Thus, when the motor 5 is on because the operator has depressed the trigger 4 to the second or intermediate position (in which the lever 10 of the camera release abuts against but does not deform the stop 25), the shaft 14 rotates the helical gear 18 and the latter oscillates and reciprocates the motion transmitting lever 20 which causes the pallet 22a of the pawl 22 to perform recurrent cylical movements along an endless path a portion of which includes the gap 24b; therefore, such actuation of the trigger 4 does not result in rotation of the program wheel 24 about the axis of the shaft 24A.

All details of the program wheel 24 and of the parts connected therewith are not shown in the drawing. Reference may be had to German Auslegeschrift No. 1,949,891 which illustrates and fully describes a dissolve mechanism employing a program wheel whose operation is analogous to that of the wheel 24. The arrangement is such that, when the program wheel 24 is set in rotary motion, it gradually closes the diaphragm (not shown) so that the camera makes exposures with fade-out effect. During the interval which is required to make exposures with fade-out, the driving element 17 is disconnected from the helical gear 16 or the take-up reel in the magazine 3 is held against rotation in another suitable way well known from the art of motion picture cameras for use with magazines containing 8mm film and having takeup reels which cannot rotate in a direction to pay out the film. During the making of exposures with fade-out, the customary pull-down or intermittent (not shown) which is driven by the motor 5 pulls the film off the supply reel in the magazine 3 whereby the frames which were exposed with fade-out form a loop which is stored in the interior of the magazine 3 downstream of the film gate. When the making of last exposure with fade-out is completed, the program wheel 24 initiates a stoppage of the motor 5 and thereupon causes the motor to rotate in the opposite direction or to move the pull-down in a direction to move the aforementioned loop (consisting of film frames already exposed with fade-out) upstream of the film gate so that such frames can be exposed again but with fade-in. When the last frame of the loop moves back to the upstream side of the film gate, the program wheel 24 arrests the motor 5 and sets the motor for renewed rotation in a direction to advance the film forwardly. Also, the driving element 17 is then free to rotate the takeup reel in a direction to collect the film as soon as the motor 5 is started in response to renewed depression of the trigger 4. Once the motor 5 is started, the program wheel 24 begins to rotate again and effects gradual opening of the diaphragm so that the film frames which were exposed with fade-out are exposed for the second time but with fade-in. When the program wheel 24 completes a full revolution, the pallet 22a of the pawl 22 (which has rotated the wheel 24 through 360°) reenters the gap 24b and the program wheel comes to a standstill at the exact moment when the camera has completed the making of the last exposure with fade-in. If the operator continues to maintain the trigger 4 in the second or intermediate position, the camera continues to make exposures but without fade-out or fade-in. Such exposures can be made on another predetermined number of film frames if the operator again depresses the trigger 4 beyond the second position, i.e., when the lever 10 is caused to deform the resilient stop 25. It will be seen that a complete revolution of the program wheel 24 about the axis of the shaft 24A results in the making of a predetermined number of exposures with fade-out, simultaneous stoppage of takeup reel in the magazine 3 (while the pull-down continues to move the film forwardly), stoppage and automatic starting of the motor 5 in a direction to cause the pull-down to transport rearwardly those frames which were exposed with fade-out, stoppage of the motor upon completed transport of the last fade-out frame to a position upstream of the gate, reconnection of the driving element 17 to the shaft 14 and resetting of the motor 5 for forward transport of the film (by the pull-down as well as by the driving element 17) in response to depression of the trigger 4.

If the camera is to make normal exposures (when the size of the aperture defined by the diaphragm is determined only by scene brightness, film speed and/or type of film in the magazine 3), the operator depresses the trigger 4 only to the extent which is needed to close the starting switch 7 (this switch is connected in series with a customary master switch 60), preferably to such an extent that the lever 10 abuts against but does not deform the resilient stop 25. The upper arm of the lever 10 carries a pivot 26a for a second pawl 26 whose pallet extends into an arcuate recess 24c in the periphery of the program wheel 24 when the latter assumes the starting position which is shown in the drawing. The upper arm of the lever 10 can further engage and displace the lobe 27a of a lever 27 which is pivotably mounted in the body 1, as at 27d, and is normally held in the illustrated position by a torsion spring 28. The upper arm 27b of the lever 27 is normally adjacent to but spaced from a projection or lug 29a of a carrier or slide 29 which is rotatable with the program wheel 24 and is movable radially of the shaft 24A under or against the bias of a helical spring 30. The carrier 29 has a single auxiliary tooth 29b which is inwardly adjacent to the gap 24b and can enter this gap when the lever 27 is pivoted clockwise so that its arm 27b engages the lug 29a and shifts the carrier 29 in a direction to the right, as viewed in the drawing.

If the operator of the camera wishes to make exposures with dissolve, the trigger 4 is pushed in the direction of arrow 11 beyond the second or intermediate position so that the lever 10 continues to maintain the starting switch 7 in closed position but it also engages and deforms the stop 25. Such pivoting of the lever 10 causes its upper arm to engage and displace the lobe 27a so that the lever 27 is pivoted clockwise and its arm 27b displaces the carrier 29 through the medium of the lug 29a. The auxiliary tooth 29b enters the gap 24b and is thus located in the path of movement of the pallet 22a of the pawl 22 which is driven by the lever 20 so that the pawl 22 starts to rotate the program wheel 24 in a clockwise direction, as viewed in the drawing. The operator can readily discern or feel that the program wheel 24 has been set in rotary motion because the depression of trigger 4 beyond the second position must be carried out against the opposition of the relatively strong resilient stop 25. Penetration of tooth 29b into the gap 24b is opposed by the spring 30 which tends to maintain the carrier 29 in the illustrated inoperative position. The pressure upon the trigger 24 can be relaxed as soon as the program wheel 24 begins to rotate becaue the pallet 22a of the pawl 22 then engages successive teeth 24a of the program wheel 24 and continues to rotate the wheel 24 in a clockwise direction. In fact, the operator can remove his finger from the trigger 4 because the rotating program wheel 24 causes its cam 24d to close a normally open auxiliary switch 31 which is connected in parallel with the starting switch 7 and completes the circuit of the motor 5 even if the lever 10 allows the starting switch 7 to open. Thus, the making of exposures with dissolve (up to the moment when the trigger 4 must be depressed again to cause the camera to start the making of exposures with fade-in) takes place in a fully automatic way and the operator can concentrate exclusively on the subject or scene because he need not be concerned with stoppage of the motor upon completion of exposures with fade-out, with resetting of the motor 5 and/or with depression of the trigger 4.

When the trigger 4 is released upon closing of the auxiliary switch 31, the levers 10 and 27 reassume the illustrated positions under the action of springs 9 and 28, and the lever 27 allows the spring 30 to expand and to return the carrier 29 to the illustrated inoperative position in which the tooth 29b is located radially inwardly of the gap 24b. The making of exposures with dissolve is completed as soon as the program wheel 24 completes a full revolution because the pallet 22a of the pawl 22 then reenters the gap 24 and is thus incapable of rotating the program wheel beyond 360°.

A lever 33 which is mounted in the camera body 1 on a pivot 32 and is biased clockwise by a torsion spring 34 serves to temporarily block the film transporting mechanism during the making of exposures with fade-out and during rearward transport of the respective film frames prior to the making of exposures with fade-in. When the program wheel 24 is held in the starting position, the left-hand arm 33a of the blocking lever 33 engages a cam 24e of the program wheel whereby the right-hand arm 33b is held out of engagement with the film transporting mechanism. When the program wheel 24 is set in motion, the cam 24e advances beyond the arm 33a and the spring 34 is free to move the arm 33b into engagement with the driving element 17 so that the takeup reel in the magazine 3 ceases to rotate; however, and as mentioned above, the pull-down continues to advance the film stepwise so that the camera makes exposures with fade-out and the corresponding frames form a loop which is stored in the magazine 3 downstream of the film gate.

The blocking lever 33 is articulately connected to a first indicating lever 35 by a pin-and-slot connection 33d, 35a. The lever 35 is pivotable in the body 1 on a pin 50 and its right-hand arm moves in front of the rear optical element of the view finder 2 when the arm 35b of the blocking lever 33 engages and holds the driving element 17 of the film transporting mechanism. The operator is then apprised of the fact that the camera is in the process of making exposures with fade-out, i.e., that the trigger 4 has been depressed sufficiently to effect a movement of the program wheel 24 from the starting position. The blocking lever 33 remains in engagement with the driving element 17 during rearward transport of those film frames which were exposed with fade-out effect and, consequently, the right-hand arm of the lever 35 can be seen in the view finder 2 until the motor 5 comes to a halt subsequent to completion of such rearward transport.

The normally closed master switch 60 (which is in series with the starting switch 7) is opened by a trip 61 of the program wheel 24 when the rearward transport of film is completed and the motor 5 is reset for renewed operation in a direction to move the film forwardly. At such stage of a dissolve operation, the pallet of the pawl 26 engages the adjacent tooth or teeth 24a of the program wheel 24.

In order to start the making of exposures with fade-in effect, the operator must depress the trigger 4 so that the latter assumes its second position in which the lever 10 can abut against but does not deform the stop 25. This suffices to advance the program wheel 24 by the width of a tooth 24a whereby the trip 61 of the program wheel causes or allows the master switch 60 to close and to thus complete the circuit of the motor 5 which begins to advance the film in a forward direction. Thus, the closing of master switch 60 is effected more or less by hand because the depression of trigger 4 from first to second position suffices to pivot the lever 10 through an angle which is necessary to rotate the program wheel 24 through the medium of the pawl 26, i.e., not in response to rotation of the motor 5 (which normally rotates the program wheel by way of the pawl 22). Once the motor 5 is started in response to closing of the master switch 60 (while the lever 10 maintains the starting switch 7 in closed position), the program wheel 24 continues to rotate, not in response to impulses from the pawl 26 but rather by way of the lever 20 and pawl 22. At the same time, the arm 33b of the lever 33 is disengaged from the driving element 17 because a cam 24f of the program wheel 24 engages and pivots the arm 33a so that the film transporting mechanism can rotate the takeup reel in the magazine 3 in a direction to collect the film. As mentioned above, the gear 16 preferably transmits motion to the element 17 by way of a friction clutch or the like so that the gear 16 can rotate when the arm 33b engages and holds the element 17. The takeup reel in the magazine 3 then collects those film frames which were exposed for the second time, i.e., first with fade-out and thereupon with fade-in effect. The making of exposures with fade-in takes placee because the rotating program wheel 24 gradually enlarges the size of the diaphragm aperture. The exact construction of the diaphragm is of no consequence; it may be a diaphragm which is mounted in the picture taking lens or a multiple-blade diaphragm.

The making of exposures with fade-in is completed when the program wheel 24 completes a full revolution. The pallet 22a of the pawl 22 then reenters the gap 29b during each of its cyclical movements so that the program wheel 24 remains in the starting position. It will be recalled that the spring 30 is free to retract the tooth 29b from the gap 24b shortly after the program wheel 24 leaves its starting position. The pallet of the pawl 26 is then again located in the recess 24c so that pivoting of the lever 10 in response to movement of the trigger 4 between first and second positions cannot result in angular displacement of the program wheel from the starting position. The next set of exposures with dissolve can be made by again depressing the trigger 4 to such an extent that the lever 10 deforms the stop 25 and causes the lever 27 to move the tooth 29b of the carrier 29 into the gap 24b of the program wheel 24.

Motion picture cameras utilizing magazines of the type wherein the takeup reel cannot be rotated in a direction to pay out exposed film cannot or should not make exposures with dissolve when the entire or major part of film is collected by the supply or takeup reel. This will be readily appreciated by bearing in mind that the interior of such a magazine does not provide room for storage of a relatively long loop of loose film upstream of the film gate when the major part of film is still stored on the core of the supply reel and that the interior of the magazine does not provide room for a relatively long loop of once-exposed film downstream of the gate when the major part of film is already collected by the core of the takeup reel. Therefore, and since it is contemplated to use the improved motion picture camera with magazines of the just mentioned type, the body 1 contains means which prevents the making of exposures with dissolve when the major part of film in a properly inserted magazine 3 is stored on the supply or takeup reel. Moreover, the camera comprises means which indicates to the operator that the major part of film is stored on one of the reels so that the space in the magazine (either upstream or downstream of the gate) is not sufficient for satisfactory storage of looped film. Such indicating means comprises a second lever 36 which is mounted on the pivot 50 for the first indicating lever 35 and has three arms 36a, 36b, 36d. The arm 36d can be moved in front of or out of register with the rear optical element of the view finder 2. The arm 36a cooperates with a sensing lever 41 which is mounted in the body 1 on a pivot 40 and has an arm 41a extending into the chamber 1B adjacent to the space for a properly inserted magazine 3. The body 1 has a recess 42 for a ball 42a which is biased toward the chamber 1B by a helical spring 42b. When the magazine 3 is removed from the chamber 1B, the ball 42a is free to bear against the arm 41a under the action of the spring 42b and pivots the sensing lever 41 clockwise, as viewed in the drawing. When the magazine 3 is reinserted, or when the chamber 1B receives a fresh magazine, such magazine depresses the ball 48a so that the lever 41 moves to the position shown in the drawing under the action of a helical spring 41A. The upper arm of the lever 41 carries a shaft with two rotary worms 43, 44 and a shaft 45 for a disk-shaped or segment-shaped film frame counter 46. The latter is biased counterclockwise by a helical spring 47 which tends to maintain it in a starting or zero position. When the chamber 1B is empty, the ball 42a maintains the sensing lever 41 in such position that the worm 43 is out of mesh with the driving element 17 and the worm 44 is out of mesh with a helical gear 48 which is mounted in the body 1, as at 48a, and meshes with a gear segment of the film frame counter 46. Therefore, the spring 47 is then free to reset the frame counter 46 to zero position because such rotation of the frame counter and worm wheel 48 is not opposed by the worms 43, 44 on the sensing lever 41.

When a magazine 3 is inserted into the chamber 1B, the spring 41A is free to return the lever 41 to the illustrated position because the magazine depresses the ball 42a into the recess 42. The worm 43 then moves into mesh with the driving element 17 and rotates the worm 44 whenever the element 17 is driven to rotate the takeup reel in the magazine 3 in a direction to collect the film. The worm 44 drives the helical gear 48 which, in turn, rotates the frame counter 46 clockwise, as viewed in the drawing. A set of numerals or other indicia on the frame counter 46 moves behind a window (not shown) in the camera body 1 so that the operator can read the length of exposed or unexposed film in the magazine which has been inserted into the chamber 1B. If desired, the worm 43 can mesh with the helical gear 16 of the film transporting mechanism. Also, the helical gear 48 may be mounted coaxially with a spur gear (not shown) which meshes with the gear segment of the frame counter 46. The shaft 48a for the gear 48 further supports a disk-shaped cam 49 which comprises a larger-diameter portion and a smaller-diameter portion and is tracked by a pin-shaped follower on the arm 36a of the second indicating lever 36. The follower engages the larger-diameter portion of the cam 49 when the frame counter 46 is close to or in the one or other end position, i.e., when the major part of or the entire film is stored on the supply reel or takeup reel. The arm 36a then maintains the arm 36d in front of the rear optical element of the view finder 2 so that the operator knows that the camera is not ready to make exposures with dissolve. Actual prevention of exposures with dissolve, when the film is stored predominantly on the supply or take-up reel, is effected by an arresting lever 51 which is biased by a spring 52 (having a neutral or dead-center position) and cooperates with a pin on the arm 36b of the indicating lever 36. The lever 51 further cooperates with a lever 53 which is biased by a spring 54 and can engage a projection 24g of the program wheel 24.

When the chamber 1B receives a magazine 3 with unexposed motion picture film therein, i.e., when the major part of film is stored on the core of the supply reel, the film frame counter 46 is located in or close to its zero position. The follower on the arm 36a of the indicating lever 36 is then in engagement with the larger-diameter portion of the cam 49 on the shaft 48a. Consequently, and as mentioned above, the arm 36d of the lever 36 is then visible by looking through the view finder 2. At the same time, the pin on the arm 36b of the lever 36 maintains the lever 51 in such position that the lever 51 stresses the springs 52, 54 and maintains one arm of the lever 53 in engagement with the projection 24g of the program wheel 24. The lever 53 then positively prevents rotation of the program wheel 24, even if the operator decides to depress the trigger 4 beyond the second position so that the lever 10 engages and deforms the stop 25 while simultaneously causing the tooth 29b of the carrier 31 to enter the gap 24b. The pawl 22 then yields by deforming a torsion spring 22b.

When the operator has completed a certain number of normal exposures (without fade-out or fade-in), the diameter of convoluted film on the supply reel in the magazine 3 decreases sufficiently to provide room for a relatively long loop of film which is formed during the making of exposures with fade-out and must be thereafter transported back upstream of the film gate, i.e., close to the supply reel. This takes place when the film frame counter 46 has been rotated through an angle which is necessary to move the larger-diameter portion of the cam 49 beyond the follower on the arm 36a. Consequently, the angular position of the indicating lever 36 changes under the bias of the springs 52, 54, i.e., by way of the levers 53, 51, so that the arm 36d moves out of register with the view finder 2 and the lever 53 is moved out of the path of movement of the projection 24g; thus, the program wheel 24 can be set in rotary motion as soon as the operator decides to depress the trigger 4 beyond the second position.

Shortly before the supply of unexposed film in the magazine 3 is exhausted, the film frame counter 46 assumes such angular position that the follower on the arm 36a is again engaged by the larger-diameter portion of the cam 49. This moves the arm 36d back in front of the rear optical element of the view finder 2 and the pin on the arm 36b causes the lever 51 to move the lever 53 back into locking or arresting engagement with the projection 24g. Thus, the program wheel 24 is again locked in the starting position and the operator is unable to make exposures with dissolve. This is indicated by the arm 36d of the lever 36 because this arm then assumes the position which is shown in the drawing. However, if the making of exposures with dissolve was started immediately or shortly before the larger-diameter portion of the cam 49 again engages and displaces the follower on the arm 36a, such exposures are completed because the lever 53 can engage and arrest the projection 24g only when the program wheel 24 assumes its starting position.

When the supply of unexposed film is exhausted, the operator opens the door which affords access to the chamber 1B and removes the magazine 3. The ball 42a then pivots the sensing lever 41 clockwise and disengages the worm 43 from the driving element 17 or helical gear 16. The worm 44 is disengaged from the gear 48 and the spring 47 is free to return the film frame counter 46 to zero position. The teeth of the counter 46 rotate the gear 48 and cam 49 so that the follower on the arm 36a engages that part of the larger-diameter portion of the cam 49 which is indicative that the major part of or the entire film is stored on the supply reel. If desired, the upper arm of the sensing lever 41 can carry a pin 41b which pivots the indicating lever 36 (by way of a follower 36c) to such position that the follower on the arm 36a is disengaged from the periphery of the cam 49 while the counter 46 moves back to the zero position. The follower on the arm 36a automatically reengages the larger-diameter portion of the cam 49 when a fresh magazine 3 is inserted into the chamber 1B, i.e., when the spring 41A is free to return the sensing lever 41 to the illustrated position.

The improved camera and its mechanism for making exposures with dissolve are susceptible of many modifications. For example, the trigger 4 may be used solely to open and close the starting switch 7; the camera is then provided with a second actuating element (not shown) which must be depressed or otherwise displaced to move the lever 27 or the carrier 29 to such position that the tooth 29b enters the gap 24b in the periphery of the program wheel 24. The just described modification is somewhat more complex because it requires a discrete second actuating element which is used to start the making of exposures with fade-out effect; however, the modified camera exhibits the same advantages as the illustrated camera, i.e., the making of exposures need not be interrupted prior to starting of the making of exposures with dissolve. All the operator has to do is to depress the second actuating element whenever he wishes to start the program wheel 24 by enabling the pallet 22a of the pawl 22 to rotate the program wheel beyond the starting position.

The motion transmitting lever 27 can be replaced with a slide which performs a translatory movement in response to movement of the release 4, 10 beyond the intermediate or second position to thereby move the carrier 29 from the illustrated inoperative position to the operative position in which the auxiliary tooth 29b extends into the gap 24b.

Without further analysis, the foregoing will so fully reveal the gist of the present invention that others can by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a motion picture camera, particularly in a camera for use with 8mm film, a combination comprising a housing; film transporting means in said housing; a prime mover mounted in said housing and being operable to actuate said film transporting means; a mechanism for making exposures with dissolve, including a program member having an annulus of teeth and being rotatable from a starting position through one revolution to thereby effect the exposure of a predetermined number of film frames with fade-out, rearward transport of said frames and the exposure of said frames with fade-in, said annulus having a gap and said mechanism being mounted in said housing and further including an advancing device receiving motion from said prime mover to perform a movement along a predetermined path including said gap in said starting position of said program member, and at least one auxiliary tooth rotatable with said program member and being movable into and from said gap; and actuating means for temporarily moving said auxiliary tooth into said gap at the will of the operator so as to enable said advancing device to move said program member from said starting position whereupon said device cooperates with the teeth of said annulus to rotate said program member.

2. A combination as defined in claim 1, wherein said advancing device comprises a pawl having a portion which is movable along said path and motion transmitting means permanently connecting said pawl with said prime mover so that said portion of said pawl performs said movement during each stage of operation of said prime mover.

3. A combination as defined in claim 2, wherein said portion of said pawl is a pallet and said motion transmitting means is arranged to impart to said pallet a cyclical movement along an endless path.

4. A combination as defined in claim 1, wherein said prime mover includes an electric motor and further comprising a normally open starting switch connected in circuit with said motor, said actuating means comprising a release movable by hand from a first position to a second position in which said switch is closed to start said motor and beyond said second position to thereby effect the movement of said auxiliary tooth into said gap while said switch remains closed.

5. A combination as defined in claim 4, further comprising a yieldable stop installed in said housing in the path of movement of said release beyond said second position to oppose such movement with a preselected force.

6. A combination as defined in claim 5, wherein said stop comprises a resilient member which is stressed by said release during movement beyond said second position.

7. A combination as defined in claim 4, wherein said mechanism further comprises a carrier for said auxiliary tooth, said carrier being rotatable with and being reciprocable relative to said program member between operative and inoperative positions in which said auxiliary tooth respectively extends into and is withdrawn from said gap, means for biasing said carrier to said inoperative position, and second motion transmitting means for moving said carrier to said operative position in response to movement of said release beyond said second position.

8. A combination as defined in claim 7, wherein said second motion transmitting means comprises a lever which is pivotable by said release to thereby move said carrier to said operative position against the opposition of said biasing means.

9. A combination as defined in claim 4, further comprising a normally open second switch connected in said circuit in parallel with said starting switch, said program member having means for closing said second switch as soon as said program member leaves said starting position and for maintaining said second switch in closed position at least during the initial stage of rotation of said program member through said one revolution so that the circuit of said motor remains completed if said actuating means allows said starting switch to open as long as said second switch remains closed.

10. A combination as defined in claim 9, wherein said means for closing said second switch comprises a cam on said program member.

11. A combination as defined in claim 1, wherein said prime mover comprises an electric motor and further comprising a normally closed master switch in circuit with said motor, a normally open starting switch in series with said master switch, and release means actuatable by hand to close said starting switch and to thus start said motor which moves said device through the medium of said motion transmitting means, said mechanism further including means for opening said master switch to thereby arrest said motor in that angular position of said program member which said program member assumes upon completion of rearward transport of said frames whereby said motor is arrested irrespective of the condition of said starting switch, and means for moving said program wheel beyond said angular position in response to actuation of said release means to thereby disengage said opening means from said master switch so that said motor is started and causes said device to rotate said program member toward said starting position.

12. A combination as defined in claim 1, wherein said means for moving said program wheel beyond said angular position comprises a pawl which engages and advances a tooth of said annulus in response to actuation of said release means.

13. A combination as defined in claim 12, wherein said program member has a recess into which said pawl extends in said starting position and during rotation of said program member from said starting position to said angular position.

14. A combination as defined in claim 13, wherein said release means comprises a lever pivotably mounted in said housing and further comprising means for articulately connecting said lever with said pawl.

15. A combination as defined in claim 14, wherein said release means further comprises a trigger which is movable by hand from a first position to a second position to thereby cause said lever to close said starting switch and to rotate said program member from said angular position through the medium of said lever and said pawl, said trigger being movable by hand beyond said second position to thereby effect the movement of said auxiliary tooth into said gap in the starting position of said program member.

16. A combination as defined in claim 1, further comprising means for blocking the actuation of said film transporting means, said program member having means for engaging said blocking means with said film transporting means during those stages of rotation of said program member which take place during exposure of said frames with fade-out and during said rearward transport of said frames.

17. A combination as defined in claim 16, wherein said film transporting means comprises a toothed rotary member and said blocking means comprises a lever which is pivotable into and from engagement with the teeth of said toothed member, and further comprising means for biasing said lever to a position of disengagement with said toothed member, said engaging means comprising a cam on said program member.

18. A combination as defined in claim 16, further comprising means for indicating the position of said blocking means with respect to said film transporting means.

19. A combination as defined in claim 18, further comprising a view finder mounted in said housing, said indicating means comprising a member which is operatively connected with and is movable by said blocking means into said view finder when said blocking means engages said film transporting means.

20. A combination as defined in claim 1 for use with motion picture film which is stored on two reels and is transported from one of said reels toward and onto the other of said reels in response to actuation of said film transporting means, and further comprising arresting means for preventing the movement of said program member from said starting position when at least the major part of the film is stored on one of said reels.

21. A combination as defined in claim 20, further comprising a resettable film frame counter movably installed in said housing and means for coupling said arresting means with said frame counter.

22. Apparatus as defined in claim 21, further comprising a view finder mounted in said housing and indicating means operatively connected with and movable by said frame counter into said view finder to indicate that said arresting means prevents rotation of said program member.

* * * * *